US011732818B2

(12) United States Patent
Tanno et al.

(10) Patent No.: US 11,732,818 B2
(45) Date of Patent: Aug. 22, 2023

(54) ELECTROMAGNETIC VALVE, VALVE DEVICE, FLUID CONTROL DEVICE, AND ELECTROMAGNETIC VALVE REPLACEMENT METHOD

(71) Applicants: FUJIKIN INCORPORATED, Osaka (JP); Koganei Corporation, Koganei (JP)

(72) Inventors: Ryutaro Tanno, Osaka (JP); Yuya Suzuki, Osaka (JP); Tsutomu Shinohara, Osaka (JP); Tomohiro Nakata, Osaka (JP); Akira Watanabe, Tokyo (JP); Takahiro Kawano, Tokyo (JP)

(73) Assignees: FUJIKIN INCORPORATED, Osaka (JP); KOGANEI CORPORATION, Tokyo (JP)

( * ) Notice: Subject to any disclaimer, the term of this patent is extended or adjusted under 35 U.S.C. 154(b) by 107 days.

(21) Appl. No.: 17/340,592

(22) Filed: Jun. 7, 2021

(65) Prior Publication Data

US 2021/0293345 A1    Sep. 23, 2021

Related U.S. Application Data

(63) Continuation of application No. PCT/JP2019/045336, filed on Nov. 19, 2019.

(30) Foreign Application Priority Data

Dec. 7, 2018 (JP) ................................. 2018-229994

(51) Int. Cl.
  *F16K 31/06* (2006.01)
(52) U.S. Cl.
  CPC ...... *F16K 31/0675* (2013.01); *F16K 31/0606* (2013.01); *F16K 31/0651* (2013.01)

(58) Field of Classification Search
  CPC ............... F16K 27/029; F16K 31/0606; F16K 31/0651; F16K 31/0655; F16K 31/0672; F16K 31/0675
  (Continued)

(56) References Cited

U.S. PATENT DOCUMENTS

| 5,850,853 A | 12/1998 | Ohmi et al. |
| 6,386,221 B1 | 5/2002 | Knoll et al. |

(Continued)

FOREIGN PATENT DOCUMENTS

| CN | 1075327 A | 8/1993 |
| CN | 1914445 A | 2/2007 |

(Continued)

OTHER PUBLICATIONS

International Search Report for International Application No. PCT/JP2019/045336; dated Feb. 4, 2020.

(Continued)

*Primary Examiner* — Matthew W Jellett
(74) *Attorney, Agent, or Firm* — Cantor Colburn LLP

(57) ABSTRACT

An electromagnetic valve has an inlet port and an outlet port. The electromagnetic valve is configured to open and close a driving fluid passage communicating the inlet port and the outlet port. The electromagnetic valve includes: a housing; a solenoid that includes a bobbin having a coil wound therearound; a moving core that is provided on an axis of the bobbin and is disposed movably in an axial direction; a stationary core that is provided on the axis of the bobbin and is fixed in the housing; and a valve that is configured to be movable together with the moving core and opens and closes the driving fluid passage. The inlet port is opened on one surface side of the housing in the axial direction of the bobbin while the outlet port is opened on the other surface side of the housing in the axial direction of the bobbin.

7 Claims, 4 Drawing Sheets

(58) Field of Classification Search
USPC .................................... 251/129.21, 129.22
See application file for complete search history.

(56) References Cited

U.S. PATENT DOCUMENTS

| | | | |
|---|---|---|---|
| 8,172,197 B2* | 5/2012 | Gu ........................... | F16K 7/17 |
| | | | 251/129.21 |
| 2006/0175563 A1 | 8/2006 | Tsubota et al. | |
| 2018/0094740 A1 | 4/2018 | Aoyama | |

FOREIGN PATENT DOCUMENTS

| | | |
|---|---|---|
| JP | 3452695 B2 | 9/2003 |
| KR | 20070012356 A | 1/2007 |

OTHER PUBLICATIONS

First Chinese Office Action corresponding to CN Application No. CN.201980077177.2; dated Sep. 21, 2022.
KR Request for the Submission of an Opinion corresponding to KR Application No. 10-2021-7016914; dated Aug. 17, 2022.

* cited by examiner

ELECTROMAGNETIC VALVE, VALVE DEVICE, FLUID CONTROL DEVICE, AND ELECTROMAGNETIC VALVE REPLACEMENT METHOD

CROSS REFERENCE TO RELATED APPLICATION

This application is a continuation application of International Application No. PCT/JP2019/045336, filed Nov. 19, 2019, which claims priority to Japanese Patent Application No. 2018-229994, filed Dec. 7, 2018. The contents of these applications are incorporated herein by reference in their entirety.

TECHNICAL FIELD

The present disclosure relates to an electromagnetic valve, a valve device, a fluid control device, and an electromagnetic valve replacement method.

BACKGROUND

A fluid-driven valve device provided with an electromagnetic valve for switching on or off a driving fluid is proposed in Japanese Patent No. 3452695.

SUMMARY

In the valve device, however, an inlet port for a driving fluid is provided on a side of the electromagnetic valve. This leads to an increase in a device size when the device includes integrated valve devices.

An object of the present disclosure is to provide an electromagnetic valve, a valve device, a fluid control device, and an electromagnetic valve replacement method, which can suppress an increase in a device size when the device includes integrated valve devices.

An electromagnetic valve having an inlet port through which a driving fluid flows in, an outlet port through which the driving fluid flow out, and a discharge port through which the driving fluid is discharged, the electromagnetic valve being placed in a flowing state where the inlet port and the outlet port communicate with each other and a draining state where the outlet port and the discharge port communicate with each other, according to one or more embodiments includes: a housing; a solenoid that is accommodated in the housing and includes a bobbin having a coil wound therearound; a stator core that is provided on an axis of the bobbin and is fixed in the housing; a moving core storage that is formed by the stationary core, an inner surface of the bobbin, and an inner surface of the housing and communicates with the inlet port; a moving core that is provided in the moving core storage and is disposed movably in the axial direction; a driving fluid passage communicating the inlet port and the outlet port; a discharge passage communicating the moving core storage and the discharge port; and a valve that is configured to be movable together with the moving core and is configured to switch between a flowing state of opening the driving fluid passage and closing the discharge passage and a discharging state of closing the driving fluid passage and opening the discharge passage. The inlet port is opened on one surface side of the housing in the axial direction of the bobbin while the outlet port and the discharge port are opened on the other surface side of the housing in the axial direction of the bobbin.

Further, a valve device according to one or more embodiments of the present disclosure includes the above electromagnetic valve and a valve body. The valve body includes a body having a fluid passage, a valve element configured to open and close the fluid passage, and an actuator including a casing connected to the body and a drive part configured to actuate the valve element by a driving fluid from the electromagnetic valve. The electromagnetic valve is located on an opposite side of the casing to the body. The housing has an external thread portion screwed into an internal thread portion of the casing.

Further, a valve device according to one or more embodiments of the present disclosure includes the above electromagnetic valve and a valve body. the valve body includes a body having a fluid passage, a valve element configured to open and close the fluid passage, and an actuator including a casing connected to the body and a drive part configured to actuate the valve element by the driving fluid from the electromagnetic valve. The electromagnetic valve is located on an opposite side of the casing to the body, and the housing is connected to the casing. An outer diameter of the housing is approximately same as an outer diameter of the casing.

Further, a fluid control device according to one or more embodiments of the present disclosure includes a plurality of fluid control instruments. At least one of the fluid control instruments is one of the above valve devices.

Further, an electromagnetic valve replacement method according to one or more embodiments of the present disclosure includes, in the above valve device, rotating the electromagnetic valve to remove the electromagnetic valve from the casing of the actuator; and screwing an external thread portion of a housing of another electromagnetic valve into an internal thread portion of the casing.

DETAILED DESCRIPTION

An electromagnetic valve, a valve device, a fluid control device, and an electromagnetic valve replacement method according to an embodiment of the present disclosure will be described below with reference to the accompanying drawings.

Figure 1:
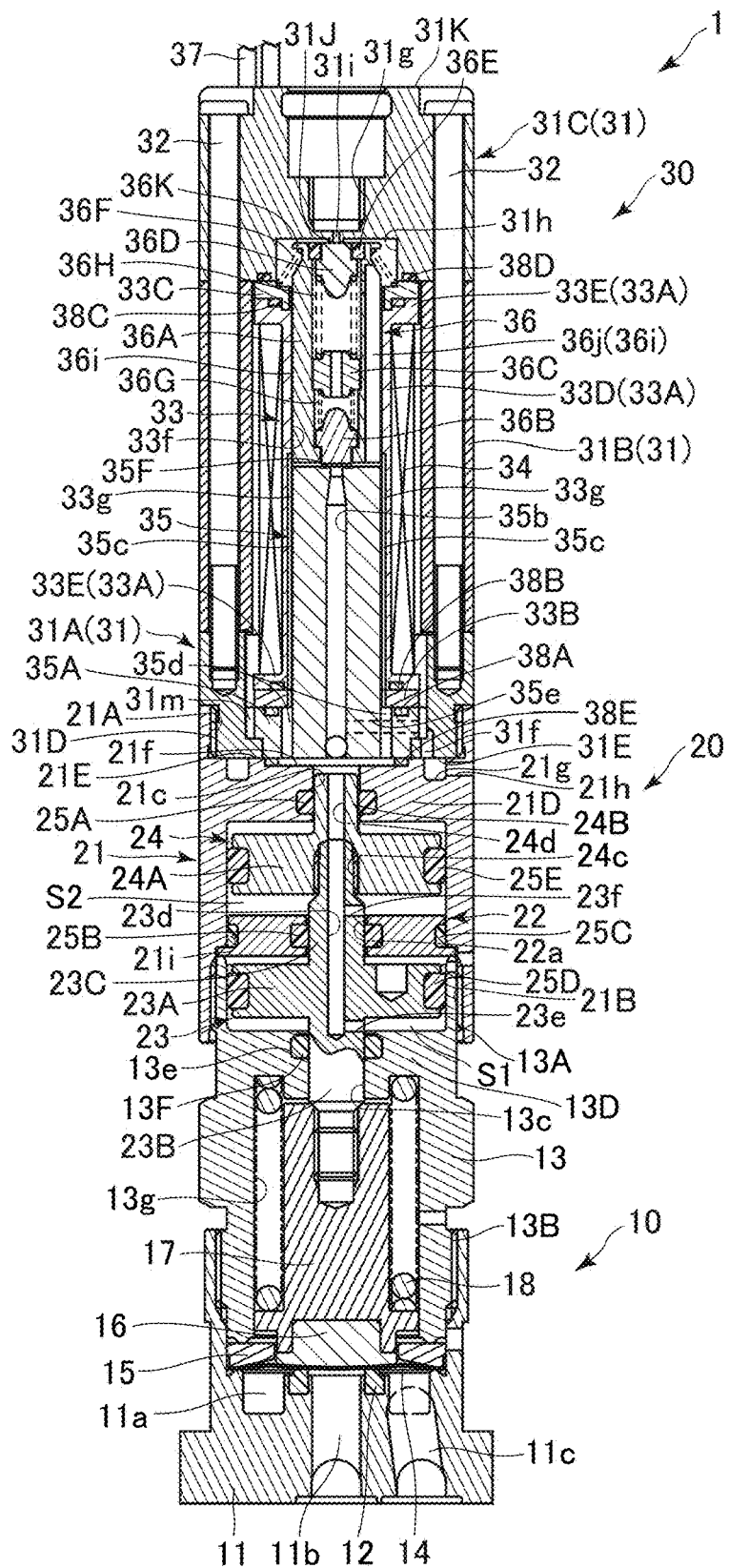
FIG. 1 is a cross-sectional view illustrating a valve device according to an embodiment of the present disclosure.

FIG. 1 is a cross-sectional view illustrating a valve device 1 in a closed state according to the embodiment. The valve device 1 according to the present embodiment is a diaphragm valve device.

As illustrated in FIG. 1, the valve device 1 includes a body 10, an actuator 20, and an electromagnetic valve 30. The body 10 and the actuator 20 correspond to a valve body. In the following description, the electromagnetic valve 30 side of the valve device 1 will be described as an upper side, and the body 10 side of the valve device 1 will be described as a lower side.

[Body 10]

The body 10 includes a body main unit 11, a sheet 12, a bonnet 13, a diaphragm 14, a retaining adapter 15, a diaphragm retainer 16, a holder 17, and a first helical compression spring 18.

Formed in the body main unit 11 are a valve chamber 11a and an inlet passage 11b and an outlet passage 11c that communicate with the valve chamber 11a. The sheet 12 has an annular shape and is provided at an edge of a portion where the valve chamber 11a and the inlet passage 11b communicate with each other.

The bonnet 13 is substantially cylindrical and has external thread portions 13A and 13B around the upper end and the lower end of the bonnet 13. The external thread portion 13B at the lower end of the bonnet 13 is screwed into an internal thread portion provided in the body main unit 11, thereby fixing the bonnet 13 to the body main unit 11 so as to cover the valve chamber 11a. Under the external thread portion 13A of the bonnet 13, a first projecting portion 13D with a first through hole 13c is provided. The first projecting portion 13D is substantially ring-shaped.

A recessed portion 13e is formed around the first through hole 13c of the first projecting portion 13D. Moreover, a first O ring 13F that is circular in cross section is provided in the recessed portion 13e. The first O ring 13F guides a vertical movement (a movement toward and away from the diaphragm 14) of a stem 23B, which will be describe later, and prevents a driving fluid from leaking from a first pressure chamber S1, which will be described later. Under the first projecting portion 13D of the bonnet 13, a first storage hole 13g having a larger inside diameter than the first through hole 13c is formed.

The diaphragm 14, which serves as a valve element, has an outer edge that is pressed and held between the retaining adapter 15 positioned at the lower end of the bonnet 13 and the edge of the valve chamber 11a of the body main unit 11. The diaphragm 14 is shaped like a spherical shell and has a circular top portion that protrudes under natural conditions. The diaphragm 14 separates from and comes into contact with the sheet 12, thereby opening and closing a fluid passage. For example, the diaphragm 14 includes a plurality of thin metal plates and is formed by cutting the metal plates into a circle and forming the metal plates into a spherical shell with a central portion expanding upward.

The diaphragm retainer 16 is provided on the diaphragm 14 and is configured so as to press the central portion of the diaphragm 14. The diaphragm retainer 16 is fit into the holder 17. The holder 17 is provided in the first storage hole 13g and is supported by the bonnet 13 so as to vertically move. The stem 23B, which will be described later, is screwed and connected to the top of the holder 17. The first helical compression spring 18 is provided in the first storage hole 13g and always urges the holder 17 downward.

[Actuator 20]

The actuator 20 is substantially cylindrical as a whole and includes a casing 21, a partition disk 22, a first piston portion 23, a second piston portion 24, and second to sixth O rings 25A to 25E.

The casing 21 is substantially cylindrical and has internal thread portions 21A and 21B inside the upper end and the lower end of the casing 21. The internal thread portion 21B at the lower end of the casing 21 is screwed onto the external thread portion 13A at the upper end of the bonnet 13, thereby fixing the casing 21 to the bonnet 13. Under the internal thread portion 21A of the casing 21, a second projecting portion 21D that projects inward with a second through hole 21c is provided. The second projecting portion 21D is substantially ring-shaped. The second O ring 25A is provided along the inner edge of the second projecting portion 21D.

An annularly recessed portion 21f is formed at the center of a top surface 21E of the second projecting portion 21D. Furthermore, an annular groove 21g is formed around the recessed portion 21f on the top surface 21E of the second projecting portion 21D. The casing 21 has a first communicating hole 21h that communicates the annular groove 21g and the outside. Under the second projecting portion 21D of the casing 21, a second storage hole 21i having a larger inside diameter than the second through hole 21c is formed.

The partition disk 22 is substantially circular with a third through hole 22a formed thereon and is provided in the second storage hole 21i of the casing 21. The partition disk 22 has an outer edge partially held between the bonnet 13 and the casing 21 and is unmovable relative to the casing 21. The third and fourth O rings 25B and 25C are provided along the inner edge and the outer edge of the partition disk 22.

The first piston portion 23 includes a first piston 23A, the stem 23B, and a first upward extending portion 23C. The first piston 23A is provided between the partition disk 22 and the first projecting portion 13D and is substantially circular with the fifth O ring 25D formed on the outer edge thereof. The first projecting portion 13D and the first piston 23A form the first pressure chamber S1. The first pressure chamber S1 is enclosed by the first O ring 13F and the fifth O ring 25D.

The stem 23B extends downward from the central portion of the first piston 23A. The stem 23B passes through the first through hole 13c and has the lower end that is screwed into and connected to the upper part of the holder 17. A vertical movement of the stem 23B is supported by the first O ring 13F.

The first upward extending portion 23C extends upward from the central portion of the first piston 23A and passes through the third through hole 22a. A vertical movement of the first upward extending portion 23C is supported by the third O ring 25B.

The first piston 23A, the stem 23B, and the first upward extending portion 23C have a first fluid-inlet passage 23d that is vertically extended. The first fluid-inlet passage 23d is opened at the upper end of the first upward extending portion 23C and extends from the first upward extending portion 23C to the upper side of the stem 23B. The stem 23B and the first upward extending portion 23C have the first fluid-inlet passage 23d and first and second fluid outlets 23e and 23f communicating the first pressure chamber S1 and a second pressure chamber S2.

The second piston portion 24 includes a second piston 24A and a second upward extending portion 24B. The second piston 24A is provided between the partition disk 22 and the second projecting portion 21D and is substantially circular with the sixth O ring 25E formed on the outer edge thereof. The partition disk 22 and the second piston 24A form the second pressure chamber S2. The second pressure chamber S2 is enclosed by the third and fourth O rings 25B and 25C and the sixth O ring 25E. The second piston 24A has a recessed portion 24c opened downward. An external thread portion provided around the upper end of the first upward extending portion 23C is screwed to an internal thread portion provided inside the recessed portion 24c, so that the first piston portion 23 and the second piston portion 24 are connected to operate as a single unit.

The second upward extending portion 24B extends upward from the central portion of the second piston 24A and is inserted into the second through hole 21c. A vertical movement of the second upward extending portion 24B is supported by the second O ring 25A. The second upward extending portion 24B has a second fluid-inlet passage 24d that vertically extends and penetrates the second upward extending portion 24B. The second fluid-inlet passage 24d communicates with the first fluid-inlet passage 23d. The upper end of the second fluid-inlet passage 24d is opened in an eleventh O ring 38E, which will be described later, toward a fixing part 35, which will be described later. The second fluid-inlet passage 24d corresponds to a supply/discharge port for supplying and discharging a driving fluid into and from a drive part.

[Electromagnetic Valve 30]

The electromagnetic valve 30 is substantially cylindrical as a whole and has approximately the same outside diameter as the actuator 20. The electromagnetic valve 30 includes a housing 31, a plurality of bolts 32, a bobbin part 33, a coil 34, the fixing part 35, a moving part 36, a power supply cable 37, and seventh to eleventh O rings 38A to 38E. The bobbin part 33 and the coil 34 constitute a solenoid.

The housing 31 is substantially cylindrical and has approximately the same outside diameter as the casing 21 of the actuator 20. The housing 31 includes a lower housing 31A, an intermediate housing 31B, and an upper housing 31C. The central axis of the lower housing 31A, the central axis of the intermediate housing 31B, and the central axis of the upper housing 31C are aligned with one another.

The lower housing 31A is substantially cylindrical and has an external thread portion 31D around the lower end thereof. The external thread portion 31D is screwed into the internal thread portion 21A of the casing 21, thereby fixing the housing 31 to the casing 21. The lower housing 31A has an undersurface 31E that is in contact with the top surface 21E of the second projecting portion 21D and covers the annular groove 21g. The lower housing 31A has a second communicating hole 31f The second communicating hole 31f communicates an annular space 31m and the annular groove 21g. The annular space 31m is disposed between the inner edge of the lower housing 31A and the outer edge of a fixing projecting portion 35A, which will be described later. The second communicating hole 31f corresponds to a discharge port. The discharge port is located near the undersurface 31E of the lower housing 31A and opened outside the eleventh O ring 38E.

The intermediate housing 31B is substantially cylindrical and is provided on the lower housing 31A.

The upper housing 31C is substantially cylindrical and has an upper recessed portion 31g on the upper side of the central portion and a lower recessed portion 31h on the lower side of the central portion. The upper housing 31C has a third communicating hole 31i that communicates the upper recessed portion 31g and the lower recessed portion 31h. The upper housing 31C has an annular upper seat 31J projecting downward. The upper seat 31J is a peripheral portion forming the third communicating hole 31i of the upper housing 31C (see FIG. 2 as well). The upper recessed portion 31g and the third communicating hole 31i correspond to an inlet port. The inlet port is opened near a top surface 31K of the upper housing 31C so as to be coaxial with the center axis of the upper housing 31C. Connected to the upper recessed portion 31g is a tube coupling provided at one end of a tube extending from a driving-pressure supply source.

Each of the bolts 32 is inserted into a bolt insertion hole of the upper housing 31C and the intermediate housing 31B and is screwed into a bolt screw hole of the lower housing 31A. This combines the lower housing 31A, the intermediate housing 31B, and the lower housing 31A into one unit.

The bobbin part 33 includes a bobbin 33A, a lower spacer 33B, and an upper spacer 33C.

The bobbin 33A is made of, for example, a resin material and includes a cylindrical portion 33D and a pair of flange portions 33E provided on both ends of the cylindrical portion 33D. The lower part of an inner surface 33f of the cylindrical portion 33D has recessed portions 33g that are disposed at multiple points in the circumferential direction so as to be vertically extended and concaved outward.

The lower spacer 33B is made of magnetic materials such as iron, is substantially shaped like a ring, and is disposed between the lower flange portion 33E of the bobbin 33A and the fixing projecting portion 35A, which will be described later. The seventh and eighth O rings 38A and 38B are respectively provided between the lower spacer 33B and the fixing projecting portion 35A, which will be described later, and between the lower spacer 33B and the lower flange portion 33E of the bobbin 33A.

The upper spacer 33C is made of magnetic materials such as iron, is substantially shaped like a ring, and is disposed between the upper flange portion 33E of the bobbin 33A and the upper housing 31C. The ninth and tenth O rings 38C and 38D are respectively provided between the upper flange portion 33E of the bobbin 33A and the upper spacer 33C and between the upper spacer 33C and the upper housing 31C.

The coil 34 is configured with a magnet wire wound around the cylindrical portion 33D of the bobbin 33A. For example, an epoxy resin may be applied between the outer surface of the coil 34 and the inner surface of the intermediate housing 31B in order to improve the heat dissipation of the coil 34.

The fixing part 35 is substantially cylindrical, is vertically extended, and is made of magnetic materials such as iron. The lower spacer 33B, the upper spacer 33C, and the fixing part 35 constitute a stator core and are placed on the axis of the bobbin 33A. The fixing projecting portion 35A that is ring-shaped and protrudes outward is provided at the lower end of the fixing part 35. The fixing projecting portion 35A is disposed inside the lower housing 31A and presses the eleventh O ring 38E from above, the eleventh O ring 38E being coaxial with the central axis of the lower spacer 33B in the recessed portion 21f The lower spacer 33B, the bobbin 33A, and the upper spacer 33C are provided on the fixing projecting portion 35A and are held between the lower housing 31A and the upper housing 31C, so that the fixing part 35 is fixed to be unmovable from the housing 31.

The fixing part 35 has a fourth through hole 35b configured to taper down toward the upper end. In other words, the fourth through hole 35b is configured such that some planes perpendicular to the axial direction are smaller in cross sectional area than other parts in the axial direction. The lower end of the fourth through hole 35b is closed by a ball. The fixing part 35 penetrates the lower spacer 33B and is inserted into the cylindrical portion 33D of the bobbin 33A. The outer surface of the fixing part 35 and the plurality of recessed portions 33g on the inner surface 33f of the cylindrical portion 33D form a driving fluid passage 35c.

The fixing projecting portion 35A of the fixing part 35 has a plurality of fifth through holes 35d circumferentially formed inside the eleventh O ring 38E. The eleventh O ring 38E corresponds to a seal member that interrupts a communication between the discharge port and the outlet port. The fifth through holes 35d each connect the driving fluid passage 35c and the recessed portion 21f The fifth through holes 35d correspond to outlet ports. The outlet ports are opened near the undersurface 31E of the lower housing 31A. A fourth communicating hole 35e is formed near the lower end of the fixing part 35. The fourth communicating hole 35e connects the fourth through hole 35b and the annular space 31m. A portion around the opening of the fourth through hole 35b at the upper end of the fixing part 35 constitutes an annular lower seat 35F projecting upward (see FIG. 2 as well). The area around the opening of the fourth through hole 35b at the upper end of the fixed part 35 constitutes an upwardly projecting annular lower valve seat 35F.

The moving part 36 includes a moving body 36A, a lower valve 36B, a spring bearing 36C, an upper valve 36D, a press-fit member 36E, and second to fourth helical compression springs 36F to 36H.

The moving body 36A is substantially cylindrical, is vertically extended, and is made of magnetic materials such as iron. The moving body 36A corresponds to a moving core. The moving body 36A is provided on the axis of the bobbin 33A, is partially placed in the cylindrical portion 33D, and is disposed movably in the vertical direction. The moving body 36A is stored in a moving core storage formed by the fixing part 35, the inner surface of the bobbin 33A, and the inner surface of the housing 31. The moving core storage communicates with the inlet ports (the upper recessed portion 31g and the third communicating hole 31i).

The outside diameter of the moving body 36A is smaller than the inside diameter of the cylindrical portion 33D of the bobbin 33A. The outer surface of the moving body 36A and the inner surface of the bobbin 33A form a driving fluid passage 36i. Moreover, an axially extending notch 36j is formed on a part of the outer surface of the moving body 36A. The notch 36j constitutes a part of the driving fluid passage 36i and receives a large amount of a driving fluid. The upper end of the moving body 36A has a flange portion 36K. The second helical compression spring 36F, which is conical in shape, is provided between the flange portion 36K and the upper spacer 33C. The moving body 36A is always urged upward by the second helical compression spring 36F.

The lower valve 36B is made of resin materials such as rubber, is substantially cylindrical, and is inserted into the bottom of the moving body 36A without being removed downward. The lower end face of the lower valve 36B can be brought into contact with and separated from the lower seat 35F. In the absence of a driving fluid, the lower end face of the lower valve 36B is separated from the lower seat 35F by the urging force of the second helical compression spring 36F. The spring bearing 36C is substantially cylindrical and is provided on the lower valve 36B with the third helical compression spring 36G interposed therebetween.

The upper valve 36D is made of resin materials such as rubber, is substantially cylindrical, and is provided on the spring bearing 36C with the fourth helical compression spring 36H interposed therebetween. The press-fit member 36E is press-fit between the moving body 36A and the upper valve 36D on the upper end of the moving body 36A, thereby preventing the upper valve 36D from being removed upward from the upper end of the moving body 36A. The upper end face of the upper valve 36D can be brought into contact with and separated from the upper seat 31J. If the coil 34 is not energized, the upper end face of the upper valve 36D is brought into contact with the upper seat 31J by the urging force of the second helical compression spring 36F. In the present embodiment, the lower recessed portion 31h and the driving fluid passages 36i and 35c constitute a driving fluid passage communicating the inlet port and the outlet port. The seventh to eleventh O rings 38A to 38E interrupt a communication between the driving fluid passage and the outside of the housing 31. Moreover, the upper valve 36D and the lower valve 36B are coaxial with each other.

The power supply cable 37 is provided to supply a driving current to the coil 34.

[Opening and Closing Operations of the Valve Device 1]

Figure 2:
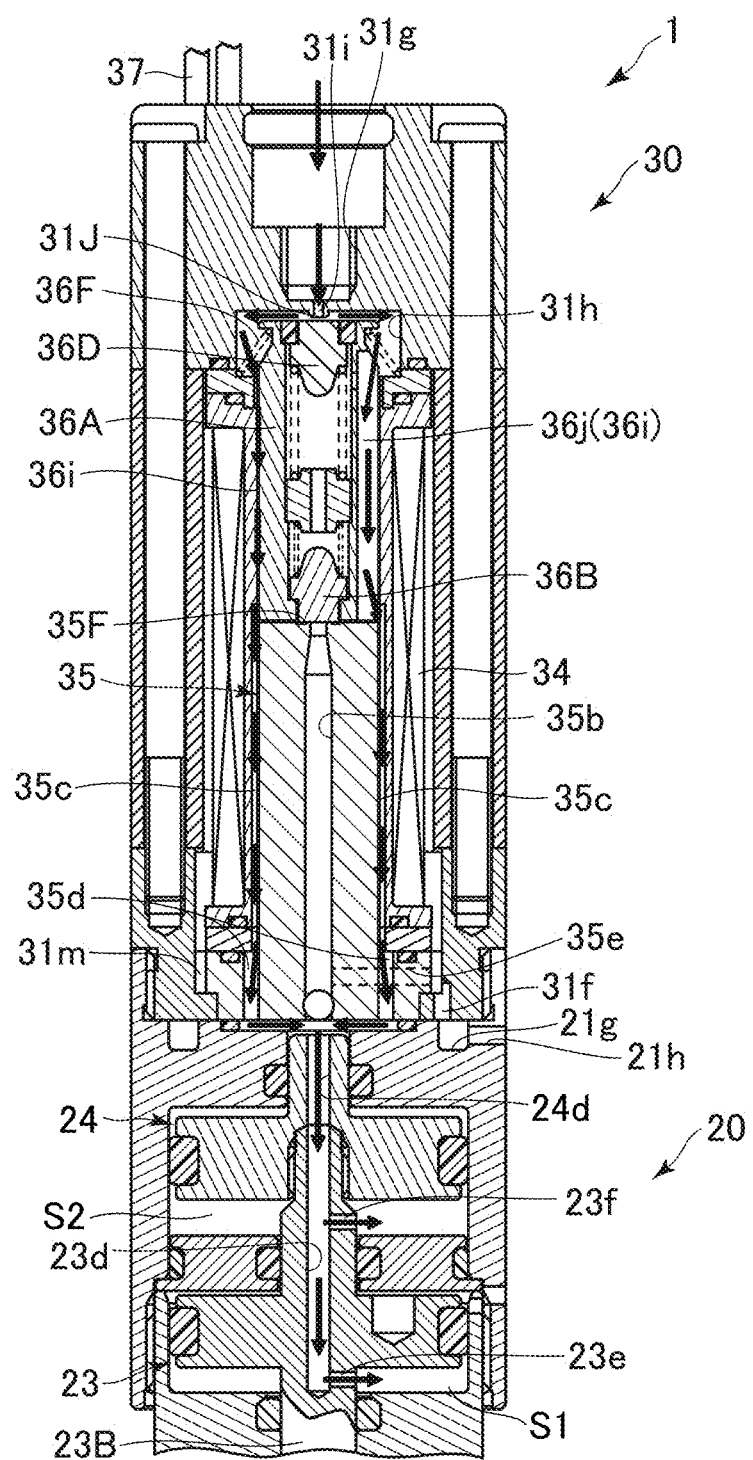
FIG. 2 is an explanatory drawing of the introduction of a driving fluid when the valve device is switched from a closed state to an opened state.
Figure 3:
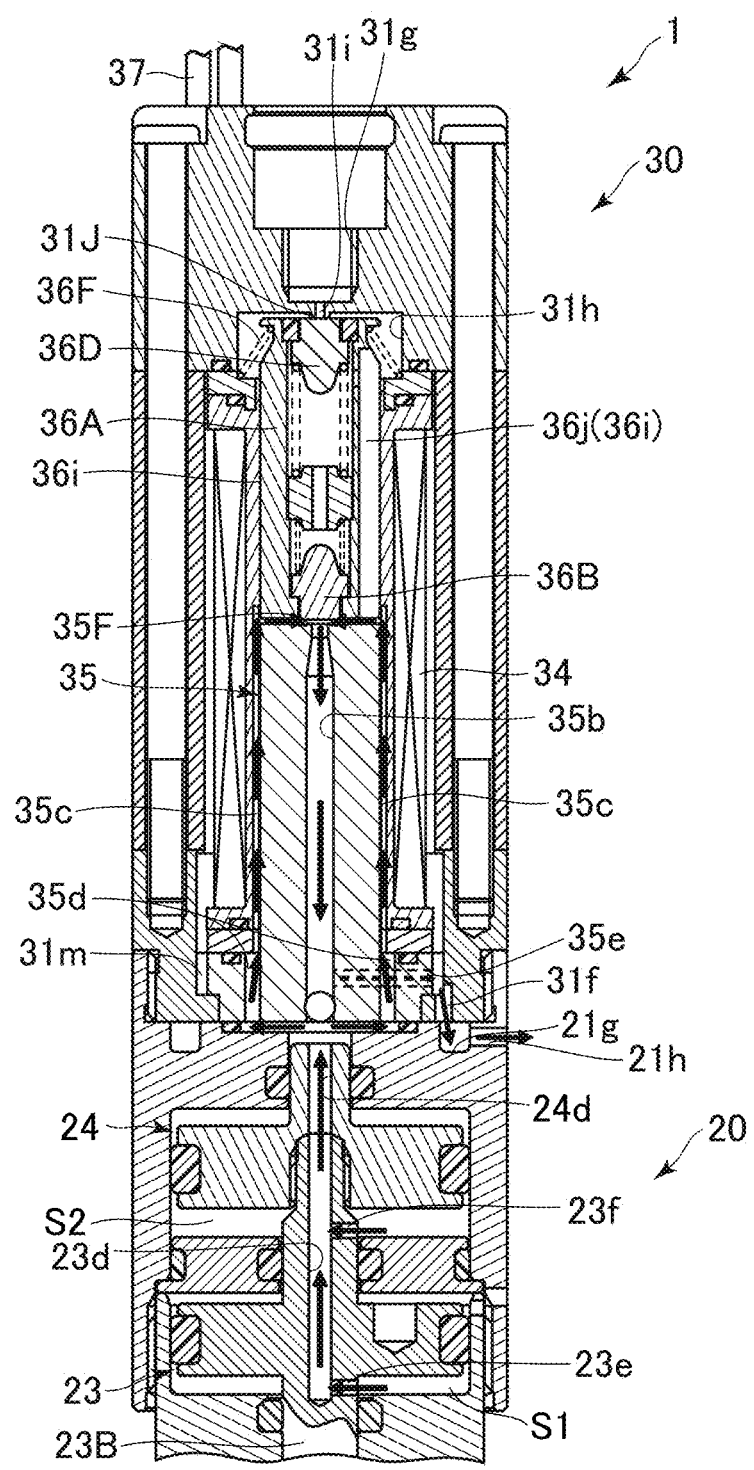
FIG. 3 is an explanatory drawing of the draining of the driving fluid when the valve device is switched from an opened state to a closed state.

Referring to FIG. 2 and FIG. 3, the opening and closing operations of the valve device 1 according to the present embodiment will be described below.

FIG. 2 is an explanatory drawing of the introduction of a driving fluid when the valve device 1 is switched from a closed state to an opened state. FIG. 3 is an explanatory drawing of the draining of the driving fluid when the valve device 1 is switched from an opened state to a closed state.

When the valve device 1 is switched from a closed state to an opened state, the coil 34 is energized through the power supply cable 37. This generates a magnetic field at the center of the coil 34, magnetizes the fixing part 35, and generates a force for attracting the moving body 36A. Thus, the moving body 36A moves to the fixing part 35 against the urging force of the second helical compression spring 36F, the upper valve 36D is separated from the upper seat 31J, and the lower valve 36B is brought into contact with the lower seat 35F. This introduces the driving fluid from the inlet port (the third communicating hole 31i) as indicated by an arrow in FIG. 2. In this way, the electromagnetic valve 30 opens the driving fluid passage and closes discharge passages (the fourth through hole 35b, the fourth communicating hole 35e, and the annular space 31m) by means of the valves (the upper valve 36D and the lower valve 36B), so that the electromagnetic valve 30 is placed in a flowing state for passing the driving fluid into the valve device 1.

The introduced driving fluid passes through the driving fluid passages (the lower recessed portion 31h, the driving fluid passages 36i and 35c), flows out of the outlet ports (the fifth through holes 35d), and flows into the second fluid-inlet passage 24d and the first fluid-inlet passage 23d. The flowing driving fluid is introduced into the first and second pressure chambers S1 and S2 through the first and second fluid outlets 23e and 23f.

As illustrated in FIG. 1, if the driving fluid is not introduced into the first and second pressure chambers S1 and S2, the holder 17, the first piston portion 23 including the stem 23B, and the second piston portion 24 are placed at the bottom dead center by the urging force of the first helical compression spring 18, and the diaphragm 14 is pressed by the diaphragm retainer 16, placing the valve device 1 in a closed state. If the driving fluid is introduced into the first and second pressure chambers S1 and S2, the holder 17, the first piston portion 23 including the stem 23B, and the second piston portion 24 move to the top dead center against the urging force of the first helical compression spring 18, and the diaphragm retainer 16 is moved upward by the elastic force of the diaphragm 14 and the pressure of the fluid, placing the valve device 1 in an opened state.

When the valve device 1 is switched from an opened state to a closed state, the energization to the power supply cable 37 is stopped. This eliminates the attraction of the fixing part 35. As illustrated in FIG. 3, the moving body 36A is moved to the upper seat 31J by the urging force of the second helical compression spring 36F, the upper valve 36D is brought into contact with the upper seat 31J, and the lower valve 36B is separated from the lower seat 35F. Thus, as indicated by arrows in FIG. 3, the driving fluid in the first and second pressure chambers S1 and S2 flows opposite to the direction of introduction, passes between the fixing part 35 and the moving body 36A, and flows into the fourth through hole 35b. The flowing driving fluid is discharged to the outside from the first communicating hole 21*h* through the fourth communicating hole 35*e*, the annular space 31*m*, the second communicating hole 31*f*, and the annular groove 21*g*. The fourth through hole 35*b*, the fourth communicating hole 35*e*, and the annular space 31*m* constitute the discharge passage. The discharge passage connects the moving core storage and the discharge port (the second communicating hole 31*f*). The electromagnetic valve 30 closes the driving fluid passage and opens the drain discharge passages by means of the valves (the upper valve 36D and the lower valve 36B), so that the electromagnetic valve 30 is placed in a discharging state for discharging the driving fluid to the outside.

The holder 17, the first piston portion 23 including the stem 23B, and the second piston portion 24 are moved from the top dead center to the bottom dead center by the urging force of the first helical compression spring 18, and the diaphragm 14 is pressed by the diaphragm retainer 16, placing the valve device 1 in a closed state. The first piston portion 23, the second piston portion 24, the first and second pressure chambers S1 and S2, and the first helical compression spring 18 correspond to the drive part of an actuator.

The electromagnetic valve 30 configured according to the present embodiment includes the inlet ports (the upper recessed portion 31*g* and the third communicating hole 31*i*) opened near the top surface 31K of the upper housing 31C and the outlet ports (the plurality of fifth through holes 35*d*) opened near the undersurface 31E of the lower housing 31A. Thus, the electromagnetic valve 30 can be directly disposed on the valve body. This can suppress upsizing of a device (e.g., a fluid control device 45 (FIG. 4)) including the integrated valve devices 1 with the electromagnetic valves 30. Since the electromagnetic valve 30 can be directly disposed on the valve body, the valve device 1 can be opened and closed at higher speeds. Furthermore, the electromagnetic valve 30 directly disposed on the valve body stabilizes the opening and closing speeds of the valve device that may be opened and closed at various speeds due to the supply of the driving fluid. This can suppress variations in the opening and closing speed of the plurality of integrated valve devices provided at the device.

The external thread portion 31D of the lower housing 31A is screwed into the internal thread portion 21A of the casing 21, thereby fixing the housing 31 of the electromagnetic valve 30 to the casing 21 of the valve body. This facilitates the mounting of the electromagnetic valve 30 on the valve body. The electromagnetic valve 30 connected to the casing 21 of the valve body may be replaced with a quick disconnect coupling having an external thread portion.

Moreover, when the external thread portion 31D of the lower housing 31A is screwed into the internal thread portion 21A of the casing 21 by the eleventh O ring 38E, the driving fluid can be supplied into the actuator 20 from the outlet port regardless of the relationship between the rotational positions of the lower housing 31A and the casing 21.

The housing 31 of the electromagnetic valve 30 has approximately the same outside diameter as the casing 21 of the actuator 20. Thus, the valve device 1 can be prevented from increasing in size in a radial direction. This can suppress upsizing of a device (e.g., the fluid control device 45 (FIG. 4)) including the integrated valve devices 1 with the electromagnetic valves 30.

[Semiconductor Manufacturing Apparatus 50]

Next, a description will be given of the fluid control device 45 in which the valve devices 1 described above are to be used and of a semiconductor manufacturing apparatus 50 including the fluid control device 45.

Figure 4:
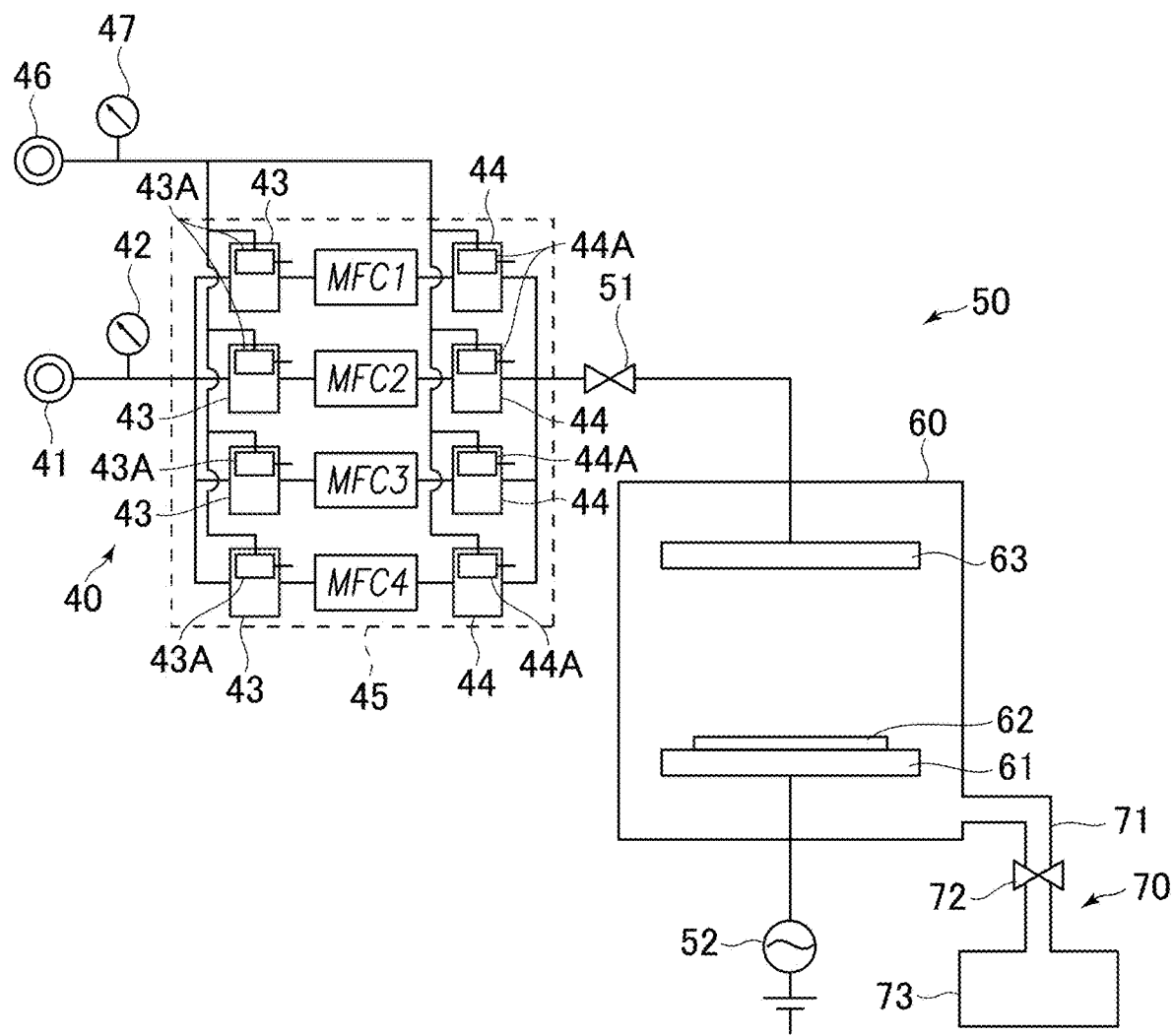
FIG. 4 is a schematic diagram of a semiconductor manufacturing apparatus.

FIG. 4 is a schematic diagram of the semiconductor manufacturing apparatus 50. For example, the semiconductor manufacturing apparatus 50 is a CVD device which includes a gas supply part 40 including the fluid control device 45, a vacuum chamber 60, and an exhaust part 70 and forms a passivation film (oxide film) over a wafer.

The gas supply part 40 includes a gas supply source 41, a manometer 42, the fluid control device 45, a driving-pressure supply source 46 and a manometer 47. The fluid control device 45 has a plurality of gas lines formed of a plurality of fluid control instruments and includes, as the fluid control instruments, open/close valve devices 43 and 44 and mass flow controllers (MFCs) 1 to 4. Between the gas supply part 40 and the vacuum chamber 60, an open/close valve device 51 is provided. The vacuum chamber 60 includes a mounting table 61 for mounting thereon a wafer 62 and an electrode 63 for forming a thin film over the wafer 62. The vacuum chamber 60 is connected to a commercial power source 52. The exhaust part 70 includes an exhaust pipe 71, an open/close valve device 72, and a dust collector 73.

When a thin film is formed over the wafer 62, by opening/closing the open/close valve devices 43, 44, and 51 and using the MFCs 1 to 4, a supply of the gas to the vacuum chamber 60 is controlled. When a powder and granular material generated as a by-product during the formation of the thin film over the wafer 62 is to be removed, the open/close valve device 72 is brought into an open state, and the powder and granular material is removed by the dust collector 73 via the exhaust pipe 71.

To the open/close valve devices 43 and 44, the valve devices 1 according to the embodiments described above can be applied. That is, each of the open/close valve devices 43 and 44 has an electromagnetic valve 43A and 44A. This can suppress upsizing of the fluid control device 45 including the integrated valve devices 1 with the electromagnetic valves 30. Consequently, this can suppress upsizing of the semiconductor manufacturing apparatus 50.

[Electromagnetic Valve Replacement Method]

A replacement method of the electromagnetic valve 30 drove predetermined number of times will be described below.

First, the electromagnetic valve 30 is rotated to be removed from the casing 21 of the actuator 20, and then the external thread portion 31D of the housing 31 of another electromagnetic valve 30 is screwed into the internal thread portion 21A of the casing 21. In this way, the electromagnetic valve 30 can be easily replaced with another, thereby improving the maintenance of the valve device 1 and the fluid control device 45.

The present disclosure is not limited to the foregoing embodiment. A person skilled in the art can make additions and changes in various ways within the scope of the present disclosure.

For example, in the foregoing embodiment, the valve device 1 is placed in a closed state under normal conditions (the driving fluid is not supplied). The valve device 1 may be placed in an opened state under normal conditions.

A semiconductor manufacturing apparatus 50 described as a CVD apparatus may be a sputtering apparatus or an etching apparatus. An etching apparatus (dry etching apparatus) includes a treatment chamber, gas supply means (fluid control device), and exhaust means and treats a material surface or the like by using the corrosive action of reactive gas. A sputtering apparatus includes a target, a vacuum chamber, gas supply means (fluid control device), and exhaust means and deposits a film on a material surface. As described above, an etching apparatus and a sputtering apparatus both include gas supply means (fluid control device), which does not increase the size of the fluid control device including the valve devices 1 with the electromagnetic valves 30. This can suppress upsizing of the semiconductor manufacturing apparatus.

What is claimed is:

1. An electromagnetic valve having an inlet port through which a driving fluid flows in, an outlet port through which the driving fluid flow out, and a discharge port through which the driving fluid is discharged, the electromagnetic valve being placed in a flowing state where the inlet port and the outlet port communicate with each other and a draining state where the outlet port and the discharge port communicate with each other,
the electromagnetic valve comprising:
a housing;
a solenoid that is accommodated in the housing and includes a bobbin having a coil wound therearound;
a stator core that is provided on an axis of the bobbin and is fixed in the housing;
a moving core storage that is formed by the stationary core, an inner surface of the bobbin, and an inner surface of the housing and communicates with the inlet port;
a moving core that is provided in the moving core storage and is disposed movably in the axial direction;
a driving fluid passage communicating the inlet port and the outlet port;
a discharge passage communicating the moving core storage and the discharge port; and
a valve that is configured to be movable together with the moving core and is configured to switch between a flowing state of opening the driving fluid passage and closing the discharge passage and a discharging state of closing the driving fluid passage and opening the discharge passage,
wherein the inlet port is opened on one surface side of the housing in the axial direction of the bobbin while the outlet port and the discharge port are opened on the other surface side of the housing in the axial direction of the bobbin, the other surface being perpendicular to the axial direction of the bobbin, the discharge port being opened on the other surface.

2. A valve device comprising:
the electromagnetic valve according to claim 1; and
a valve body,
wherein the valve body includes a body having a fluid passage, a valve element configured to open and close the fluid passage, and an actuator including a casing connected to the body and a drive part configured to actuate the valve element by a driving fluid from the electromagnetic valve,
the electromagnetic valve is located on an opposite side of the casing to the body, and
the housing has an external thread portion screwed into an internal thread portion of the casing.

3. A valve device comprising:
the electromagnetic valve according to claim 1; and
a valve body,
wherein the valve body includes a body having a fluid passage, a valve element configured to open and close the fluid passage, and an actuator including a casing connected to the body and a drive part configured to actuate the valve element by the driving fluid from the electromagnetic valve,
the electromagnetic valve is located on an opposite side of the casing to the body, and the housing is connected to the casing, and
an outer diameter of the housing is approximately same as an outer diameter of the casing.

4. The valve device according to claim 2, further comprising:
a seal member disposed on the other surface side of the housing to be coaxial with the housing; and
a supply/discharge port configured to supply and discharge the driving fluid into and from the drive part,
wherein the outlet port is opened on an inside of the seal member,
the discharge port is opened on an outside of the seal member, and
the supply/discharge port is opened on the inside of the seal member.

5. A fluid control device comprising a plurality of fluid control instruments,
wherein at least one of the fluid control instruments is the valve device according to claim 2.

6. A fluid control device comprising a plurality of fluid control instruments,
wherein at least one of the fluid control instruments is the valve device according to claim 3.

7. An electromagnetic valve replacement method comprising:
in the valve device according to claim 2, rotating the electromagnetic valve to remove the electromagnetic valve from the casing of the actuator; and
screwing an external thread portion of a housing of another electromagnetic valve into an internal thread portion of the casing.

* * * * *